United States Patent Office 3,317,015
Patented May 2, 1967

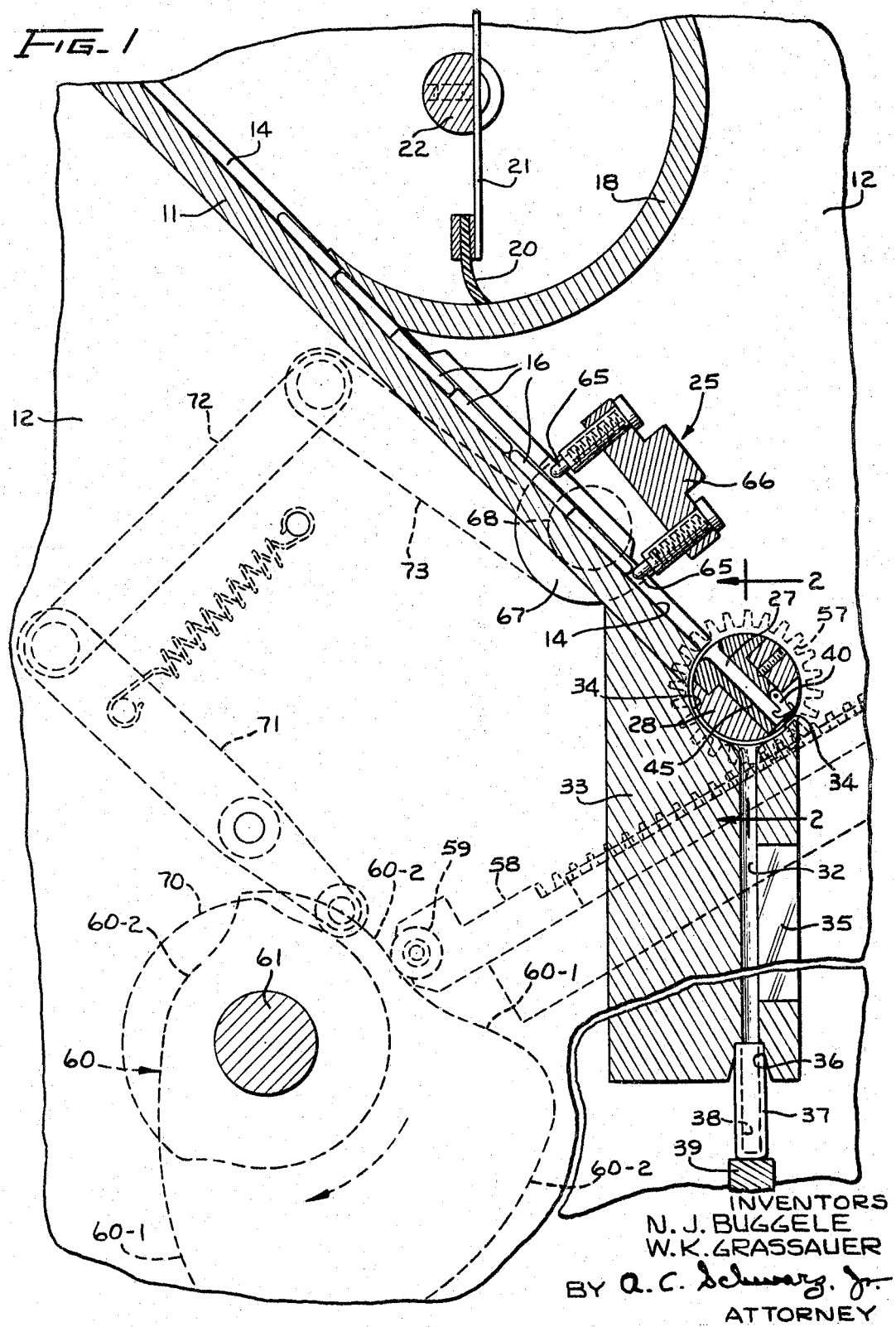

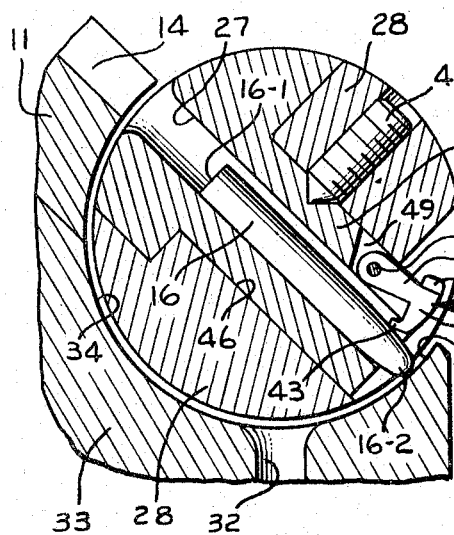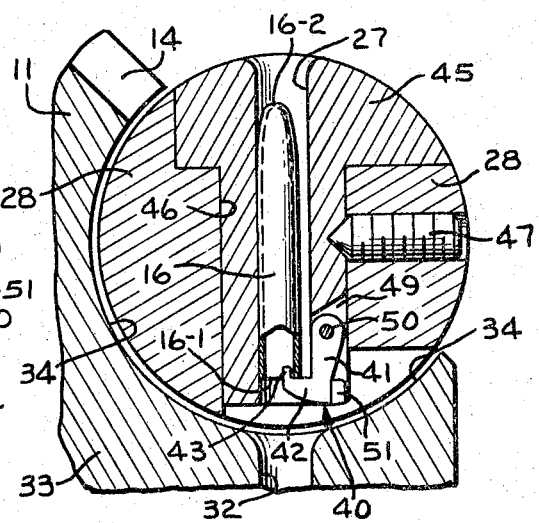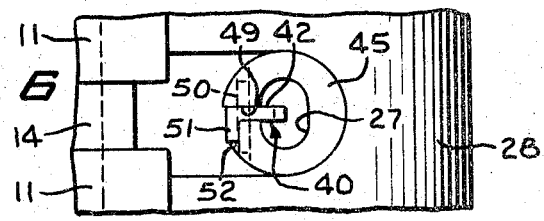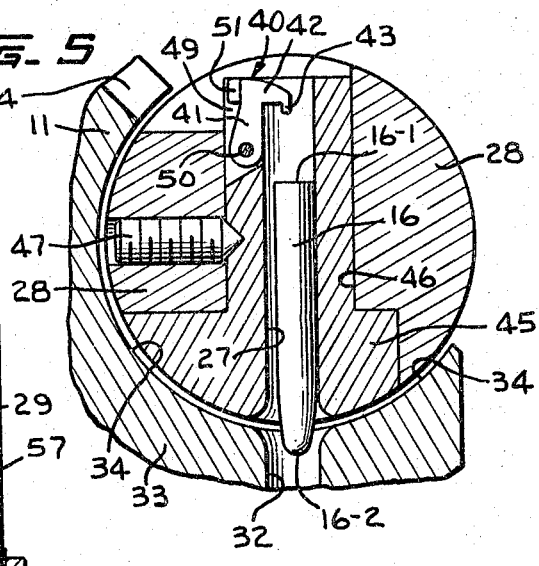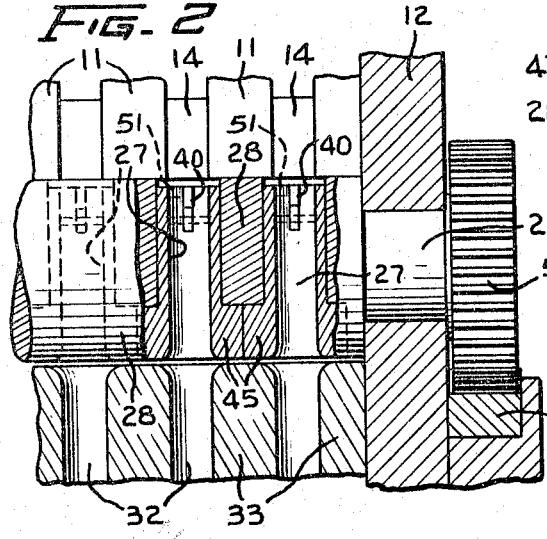

3,317,015
APPARATUS FOR ORIENTING ELONGATED ARTICLES HAVING ROUND AND RECESSED ENDS RESPECTIVELY
Norman J. Buggele, Berwyn, and Willie K. Grassauer, Downers Grove, Ill., assignors to Western Electric Company, Incorporated, New York, N.Y., a corporation of New York
Filed Mar. 7, 1966, Ser. No. 532,311
6 Claims. (Cl. 193—43)

This invention relates to an apparatus for orienting elongated articles each having one end shaped differently than the other, and more particularly to mechanism for orienting tubular shells each provided with an open end and a round closed end.

An object of the invention is to provide a device for effectively orienting elongated articles each having a round end and a recessed end.

Another object of the invention is to provide an efficient mechanism for orienting tubular shells having open and round closed ends respectively.

An apparatus illustrating certain features of the invention may include an obliquely disposed plate having parallel laterally spaced obliquely disposed grooves therein for randomly receiving tubular shells end to end and for guiding them one at a time, under control of an escapement, into respective apertures extending transversely through a cylindrical orienting member. The orienting member is mounted for rotation about a horizontal axis and is actuated cyclically to a first position with the apertures disposed obliquely in alignment with the grooves for receiving the shells therein, then to a second position with the apertures disposed vertically and with one end, respectively, of the apertures directed downwardly in alignment with vertical guideways for receiving the articles, and then to an inverted third position with the other ends of the apertures directed downwardly.

A shell moving round end first into an aperture of the orienting member deflects a hook pivotally mounted or the member and extending partially into the aperture adjacent the one end thereof. The round end of the shell after deflecting the hook engages a stationary curved wall which encircles a portion of the member and serves to retain the shell in the aperture as the member is rotated to the second position in which the shell is aligned with the vertical guideway and drops thereinto round end first. A shell moving open end first into an aperture in the orienting member engages the hook and is retained thereby as the member is rotated to the second position, and when the member is further rotated through one-half turn to the third position the shell drops from the aperture into the vertical guideway, round end first.

Other objects, advantages, and novel aspects of the invention will become apparent upon consideration of the following detailed description, in conjunction with the accompanying drawings, in which:

FIG. 1 is a fragmentary vertical sectional view of the apparatus for orienting articles and embodying the present invention;

FIG. 2 is a fragmentary vertical cross-sectional view of the apparatus taken along the line 2—2 of FIG. 1 and showing the apertures through an orienting member in a vertical position;

FIGS. 3–5 are enlarged fragmentary cross-sectional views of the apparatus showing the orienting member in different positions; and FIG. 6 is a fragmentary plan view of the structure shown in FIG. 5.

Referring to the drawings the apparatus comprises an obliquely disposed plate 11 supported by and between a pair of vertical side frame plates 12 and having a plurality of laterally spaced grooves 14 in the upper side thereof. The grooves 14 form obliquely disposed guideways for receiving articles 16 in end to end relation therein. The articles which are in the form of tubular shells, each having a flat open end 16–1 and a closed round end 16–2, are dropped onto the upper end of the inlined plate 11 and fall randomly open end or closed end first into the guideways 14 as they move downwardly by gravity along the inclined plate.

Those shells which do not find their way into the guideways 14 are stopped by a curved wall 18 and are propelled onto the upper portion of the plate 14 by flexible flat blades 20 which are secured to arms 21 on a rotary shaft 22. The shaft is mounted in the side frames 12 in eccentric relation to the inner periphery of the circular wall 18 so as to effect the flexing of the blades and the release thereof at a predetermined point in their rotation resulting in the upward movement of the shells.

The shells 16 in the guideways 14 are released one at a time by an escapement mechanism 25 and are guided into aligned apertures 27 arranged in a row and extending transversely through a rotary cylindrical orienting member 28 at the lower end of the inclined plate 11. Reduced portions 29 on opposite ends of the orienting member 28 are journalled in apertures in the vertical frame plates 12 and support the orienting member for oscillatory movement about a horizontal axis to a first position (FIGS. 1 and 3) with the apertures 27 disposed obliquely in alignment with the guideways 14 and to second and third positions (FIGS. 4 and 5) with the apertures 27 disposed vertically in alignment with vertical guideways 32.

The vertical guideways are formed in a vertically disposed composite wall 33. Portions of the wall 33 and the plate 11 are shaped to provide a curved surface 34 encircling a portion of the orienting member 28, the surface 34 serving to retain the shells 16 within the apertures 27 during the turning of the orienting member 28 from the first position (FIG. 3) to the second position (FIG. 4).

A portion of the vertical wall is in the form of a removable transparent plate 35 to permit observation of the shells as they pass along the vertical guideways 32 and to permit removal of the shells from the guideways in the event of jamming. The lower portion of the vertical wall 33 is provided with a horizontal recessed seat 36 for receiving the upper portion of a tray 37 in which pockets 38 are formed for receiving the shells 16. A vertically movable carrier 39 may be provided for raising and lowering the tray 37.

A pivoted hook-shaped element 40 is provided for each aperture 27 of the orienting member 28 to engage the open end 16–1 of a shell fed into the aperture open end first, and to retain the shell within the aperture 27 as the shell is rotated by the orienting member to the second position, open end down (FIG. 4), over the vertical guideway 32. The element 40 releases the shell 16 when the shell has been turned by the orienting member 28 through another one-half revolution to the third position (FIG. 5) with the round end down whereupon the shell properly oriented drops into the vertical guideway 32 round end first. The hook-shaped retaining element has a shank portion 41, a retaining finger 42 extending laterally from the shank portion, and a tip 43 extending transversely from the end of the finger 42.

To facilitate mounting of the retaining elements 40, the orienting member 28 is formed as a composite structure having sleeves 45 which fit in transverse openings 46 in the member 28 and in which the apertures 27 are formed. The sleeves 45 are secured to the orienting member by set screws 47 and have enlarged end portions which conform to the outer curvature of the orienting member. Each hook-shaped element 40 fits in a slot 49 in the sleeve 45 and is supported for free pivotal movement on a pin 50 mounted in the sleeve.

A laterally extending lip 51 on the element 40 (FIG. 6) is engageable with a shoulder 52 on the sleeve 45 to limit the inward movement of the element to a normal operative position (FIG. 1) in which the element is effective to engage the open end 16–1 of a shell 16 and retain the shell within the aperture 27 during a portion of the rotary movement of the member. The arrangement is such that when a shell enters the aperture round end first, the round end of the shell engages the tip 43 of the hook-shaped element 40 and pivots the element outwardly as the shell 16 advances by gravity relative thereto into engagement with the curved stationary stop surface 34. The element 40 is free to move outwardly sufficiently to permit movement of the shell 16 therepast when the shell has been rotated by the orienting member 28 to a vertical position (FIG. 4) at which position the shell drops, round end first, into the vertical passageway 32.

Cyclical movement of the orienting member 28 to the first, second, and third positions is imparted by a gear 57 on the orienting member, and a rack bar 58 meshing with the gear and slidably mounted on a vertical frame plate 12. The rack bar has a cam follower 59 cooperable with a cam 60 on a cam shaft 61 which is rotated by a motor (not shown). Suitable sloping cam surfaces 60–1 and concentric dwell surfaces 60–2 are formed on the cam 60 for effecting the oscillatory movement of the orienting member 28 to the three positions and providing predetermined periods of dwell at such positions.

The escapment mechanism 25 includes pairs of fingers 65 individual to the inclined guideways 14 and mounted on a rocker bar 66. The latter extends above and transversely of the guideways 14 and has a pair of laterally disposed end lugs 67 supported on fixed pivot pins 68. Oscillation of the rocker bar in timed relation to the movement of the orienting member 28 is effected by a cam 70 on the cam shaft 61 in cooperation with a cam lever 71, a link 72, and a lever arm 73 secured to the rocker bar 66. In one position of the rocker bar (FIG. 1) one of the escapement fingers 65 is disposed in the path of movement of the row of shells 16 and serves to stop them, and the second finger 65 is in a raised position above the second shell in the row. As the rocker bar 66 is moved to the other position the second escapement finger will engage the second shell in the row as the first escapment finger is raised and releases the first shell 16.

For each cycle of operation and each rotation of the cam shaft one shell 16 is released by the escapement mechanism 25 in each of the inclined guideways 14 and advances downwardly into the aligned aperture 27 of the rotary orienting member 28 disposed in the first position (FIG. 3). If the shell 16 enters the aperture 27 round end first, the round end portion thereof will engage the tip 43 of the hook-shaped element 40 and pivot the element laterally out of its path of movement and the shell will be stopped by engagement of the round end 16–2 thereof with the curved stop surface 34 of the wall 33.

Thereafter the orienting member 28 is rotated in a clockwise direction from the first position (FIG. 3) to the second position (FIG. 4) with the aperture 27 in vertical alignment with the vertical guideway 32, whereupon the shell 16, properly oriented round end first, drops into and through the vertical passageway 32 and into the pocket 38 of the tray 37 supported therebelow.

From its second position the orienting member 28 is rotated in a counterclockwise direction through one-half revolution to the third position (FIG. 5) with the aperture 27 in vertical alignment with the vertical passageway. However, since the shell 16 has already been transferred from the recess no further action transpires. The orienting member 28 is then rotated in clockwise direction from the third position (FIG. 5) to the first position (FIG. 3) and the escapement mechanism 25 is actuated in timed relation thereto to release another shell 16 for movement along the oblique guideway 14 into the aligned aperture 27 of the orienting member.

If the shell 16 entering the aperture 27 advances with the open end first, the open end 16–2 thereof will engage the finger 42 of the hook-shaped element 40 disposed in its path and will be stopped thereby. The hook-shaped element 40 retains the shell 16 in the aperture 27 as the orienting member moves from the first position (FIG. 3) to the second position (FIG. 4) and prevents the transfer of the non-oriented shell from the aperture 27 into the vertical passageway 32. After a short period of dwell the orienting member 28 is rotated in a counterclockwise direction through one-half turn to the inverted third position (FIG. 5) to properly orient the shell 16 and align it with the vertical passageway 32 whereupon the shell 16, properly oriented, drops, round end first, from the aperture 27 into and through the vertical passageway 32 and into a pocket 38 of the tray 37. As the orienting member 28 approaches the inverted position the shell 16 may drop downwardly from the retaining element 40 into engagement with a portion of the curved surface 34 and be retained thereby in the aperture 27 of the orienting member until the shell is carried into alignment with, and drops into the guideway 32.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for orienting elongated articles having round ends and recessed ends respectively which comprises:

an orienting member having an aperture therethrough for receiving an article therein;

an element mounted movably on said member with a portion thereof extending laterally into said aperture in the path of movement of the articles for engaging the recessed end of an article fed into said aperture recessed end first and retaining the article against movement therethrough, said element being moved laterally of said aperture by an article fed into said aperture round end first to permit movement of the article through said aperture;

means for rotating said orienting member to a first position with said aperture disposed for receiving an article therein, and to a second position for reversing a retained article fed thereinto recessed end first whereby said article may exit from said aperture round end first;

means for randomly feeding the articles successively into said aperture of said orienting member in the first position; and means for receiving the articles in oriented relation from said orienting member.

2. In an apparatus for orienting tubular articles having open ends and closed round ends respectively, the combination of:

an orienting member mounted for rotation about a substantially horizontal axis and having an aperture therethrough transversely of the axis for receiving an article therein;

a hook-shaped element supported pivotally on said orienting member and having a normal position with a portion thereof extending laterally into said apertures in the path of movement of the articles for engaging the open end of an article fed into said aperture open end first and for preventing movement of the article from the aperature open end first, said element being moved laterally of said aperture by an article fed into said aperture round end first to permit movement of the article from said orienting member round end first;

means for rotating said orienting member to a first position with said aperture disposed for movement of the articles thereinto by gravity and to a second position for inverting an article fed into said aperture open end first to permit movement of the article from said aperture round end first;

means for feeding articles randomly arranged into said aperture of said orienting member in the first position; and guide means for receiving the articles from said orienting member in oriented relation.

3. In an apparatus for orienting elongated tubular articles having closed round ends and open ends respectively, the combination of:

a first guideway for guiding articles randomly arranged therein in end to end relation for movement by gravity along a first path;

an orienting member supported at the end of said guideway for rotation about a horizontal axis and having an aperture therethrough transversely of said axis for receiving an article therein from said first guideway;

means forming a second guideway in oblique relation to said first guideway for receiving the articles from said aperture in said orienting member;

means for rotating said orienting member to a first position with said aperture aligned with said first guideway and with one end of said aperture adjacent to said guideway for receiving an article therein, to a second position with said aperture aligned with said second guideway and with the other end of said aperture adjacent thereto, and to an inverted third position with said aperture aligned with said second guideway and said one end of said aperture adjacent thereto;

means adjacent said orienting member for retaining an article in said aperture therein during the movement of said orienting member from the first position to the second position; and a hook-shaped element mounted pivotally on said orienting member and having a portion extending transversely into said aperture when said orienting member is in the first position for engaging the open end of an article moving open end first into said aperature and preventing movement of the article open end first from said aperture when said orienting member is moved to the second position, and for permitting movement of the article round end first from said aperture when said orienting member is moved to the inverted third position, said element being moved laterally of said aperture by an article moving round end first into said aperture to permit movement of the article round end first from said aperture when said orienting member is moved to the second position.

4. An article orienting structure as defined in claim 3 characterized in that the first guideway is disposed obliquely upwardly from said orienting member and said second guideway is disposed upright beneath said orienting member.

5. An article orienting structure as defined in claim 4 including the provision of:

escapement mean operable in timed relation to the actuation of said orienting member for releasing the articles individually in said first guideway for movement into said aperture in said orienting member.

6. An apparatus for orienting elongated tubular articles each having a closed round end and an open end, which comprises:

a cylindrical orienting member mounted for rotation about a horizontal axis and having a longitudinal row of apertures extending therethrough transversely of the axis in parallel and laterally spaced relation to one another for receiving an article in each thereof;

means for rotating said orienting member to a first position with said apertures disposed obliquely, to a second position with said apertures disposed vertically and with one end respectively of the apertures directed downwardly, and to an inverted third position with the other end of said aperatures directed downwardly;

means forming a plurality of upright guideways below said orienting member in alignment with said apertures thereof when said orienting member is in said second and said third positions for receiving the articles from said apertures;

means forming a plurality of parallel laterally spaced guideways extending obliquely upwardly from said orienting member in alignment with said apertures thereof when said orienting member is in the first position for supporting rows of the articles randomly arranged in end to end relation and for guiding them into said apertures;

stationary means encircling a portion of said orienting member for retaining the articles in said apertures during the movement of said orienting member from said first position to said second position;

an article retaining element for each of said apertures mounted pivotally on said orienting member adjacent to said one end of said aperture and having a hooked-shaped retaining finger extending transversely of and into said aperture and engageable with the open end of an article moving open end first into said aperture for preventing movement of the article from said one end of said aperture when said member is moved to the second position and for permitting movement of the article round end first from said aperture when said member is moved to said third position, said hooked-shaped finger being engaged by the round end of an article moving round end first into said aperture and being moved by the article laterally of said aperture so as to permit movement of the article round end first from said one end of said aperture when said member is moved to the second position; and escapement means operable in timed relation to the actuation of said orienting member for releasing the articles individually in said obliquely disposed guideways, respectively.

References Cited by the Examiner

UNITED STATES PATENTS 2,535,648  12/1950  Mills _____ 193—43
2,875,884  3/1959  Harrington _____ 193—43

EVON C. BLUNK, *Primary Examiner.*

H. C. HORNSBY, *Assistant Examiner.*